US011318549B2

(12) United States Patent
Losiewicz et al.

(10) Patent No.: US 11,318,549 B2
(45) Date of Patent: May 3, 2022

(54) SOLDER PASTE BEAD RECOVERY SYSTEM AND METHOD

(71) Applicant: Illinois Tool Works Inc., Glenview, IL (US)

(72) Inventors: William A. Losiewicz, Douglas, MA (US); Matthew F. Schumacher, Edina, MN (US); Bruce C. Seaton, Essex (GB); Kenneth J. King, East Freetown, MA (US)

(73) Assignee: Illinois Tool Works Inc., Glenview, IL (US)

( * ) Notice: Subject to any disclaimer, the term of this patent is extended or adjusted under 35 U.S.C. 154(b) by 44 days.

(21) Appl. No.: 16/897,526

(22) Filed: Jun. 10, 2020

(65) Prior Publication Data

US 2020/0391314 A1  Dec. 17, 2020

Related U.S. Application Data

(60) Provisional application No. 62/991,744, filed on Mar. 19, 2020, provisional application No. 62/861,025, (Continued)

(51) Int. Cl.
*B23K 3/00* (2006.01)
*B23K 3/06* (2006.01)
*B23K 3/08* (2006.01)

(52) U.S. Cl.
CPC .............. *B23K 3/0638* (2013.01); *B23K 3/08* (2013.01)

(58) Field of Classification Search
CPC ........ B23K 3/0638; B23K 3/08; B23K 1/008; B23K 3/087; B23K 1/0016; B23K 2101/42; B23K 35/025
(Continued)

(56) References Cited

U.S. PATENT DOCUMENTS 3,684,151 A * 8/1972 Burman ............... B23K 3/0669
228/19
3,779,161 A 12/1973 Tatebe
(Continued)

FOREIGN PATENT DOCUMENTS

CN 207266515 U 4/2018
JP H04197684 A 7/1992
(Continued)

OTHER PUBLICATIONS

Notification of Transmittal of the International Search Report and the Written Opinion of the International Searching Authority from corresponding PCT/US2020/037154 dated Oct. 8, 2020.

*Primary Examiner* — Kiley S Stoner
(74) *Attorney, Agent, or Firm* — Lando & Anastasi, LLP

(57) ABSTRACT

A stencil printer is configured to print an assembly material on an electronic substrate. The stencil printer includes a frame, a stencil coupled to the frame, a support assembly coupled to the frame, and a print head gantry coupled to the frame. The print head gantry includes an elongate beam that rides along rails provided on the frame and a print head assembly supported by the print head gantry in such a manner that the print head assembly is configured to traverse the stencil during print strokes. The print head assembly includes a print head having a squeegee blade assembly configured to roll solder paste along the stencil. The stencil printer further includes a solder paste bead recovery system configured to remove a bead of solder paste from a top surface of the stencil and to deposit the bead of solder paste onto a new replacement stencil.

23 Claims, 16 Drawing Sheets

Related U.S. Application Data filed on Jun. 13, 2019, provisional application No. 62/861,031, filed on Jun. 13, 2019, provisional application No. 62/861,035, filed on Jun. 13, 2019.

(58) Field of Classification Search
USPC .................. 228/39, 248.1–248.5; 148/23–24
See application file for complete search history.

(56) References Cited

U.S. PATENT DOCUMENTS

| | | | |
|---|---|---|---|
| 4,195,567 A | 4/1980 | Mitter | |
| 4,362,486 A | 12/1982 | Davis et al. | |
| 4,924,304 A | 5/1990 | Freeman | |
| 5,044,306 A * | 9/1991 | Erdmann | H05K 3/1233 |
| | | | 118/120 |
| 5,265,773 A | 11/1993 | Harada | |
| 5,287,806 A * | 2/1994 | Nanzai | B23K 3/0692 |
| | | | 101/123 |
| 5,380,138 A | 1/1995 | Kasai et al. | |
| 5,392,710 A | 2/1995 | Li | |
| 5,421,516 A * | 6/1995 | Saitou | B05C 5/004 |
| | | | 118/DIG. 4 |
| 5,436,028 A | 7/1995 | Becher et al. | |
| 5,478,700 A * | 12/1995 | Gaynes | H01L 24/83 |
| | | | 430/315 |
| 5,554,412 A * | 9/1996 | Lymn | B23K 1/206 |
| | | | 118/314 |
| 5,669,970 A | 9/1997 | Balog et al. | |
| 5,947,022 A | 9/1999 | Freeman et al. | |
| 6,162,661 A * | 12/2000 | Link | B23K 3/0692 |
| | | | 438/108 |
| 6,247,640 B1 * | 6/2001 | Kuwazaki | H01L 21/4853 |
| | | | 228/180.22 |
| 8,011,557 B1 * | 9/2011 | Zhang | B23K 1/0016 |
| | | | 228/4.5 |
| 8,033,216 B2 | 10/2011 | Chen | |
| 2001/0044979 A1 | 11/2001 | Ravkin | |
| 2002/0019680 A1 | 2/2002 | Nishikawa et al. | |
| 2002/0020346 A1 | 2/2002 | Doyle et al. | |
| 2003/0037804 A1 * | 2/2003 | Erdmann | B23K 1/018 |
| | | | 134/9 |
| 2003/0066540 A1 * | 4/2003 | Sachdev | C11D 7/263 |
| | | | 134/1 |
| 2004/0089174 A1 | 5/2004 | Ghisalberti et al. | |
| 2004/0108368 A1 * | 6/2004 | Onishi | H05K 3/1233 |
| | | | 228/248.1 |
| 2004/0217166 A1 | 11/2004 | Myers et al. | |
| 2006/0219755 A1 * | 10/2006 | Kajii | B23K 1/206 |
| | | | 228/39 |
| 2007/0175343 A1 | 8/2007 | Prince | |
| 2010/0270357 A1 * | 10/2010 | Honma | B23K 1/0016 |
| | | | 228/9 |
| 2012/0145014 A1 | 6/2012 | Doyle | |
| 2012/0175383 A1 | 7/2012 | Engels et al. | |
| 2015/0129641 A1 * | 5/2015 | Kuroda | B23K 1/0016 |
| | | | 228/41 |
| 2016/0159073 A1 * | 6/2016 | Liu | B41F 15/40 |
| | | | 101/123 |
| 2017/0158431 A1 | 6/2017 | Hamilton et al. | |
| 2017/0297131 A1 * | 10/2017 | Seyama | B23K 3/082 |
| 2018/0009247 A1 | 1/2018 | Atwood et al. | |
| 2018/0250744 A1 * | 9/2018 | Symeonidis | B23K 26/034 |
| 2020/0391499 A1 | 12/2020 | Lynch et al. | |

FOREIGN PATENT DOCUMENTS

| | | |
|---|---|---|
| JP | 2000103031 A | 4/2000 |
| KR | 10-1517387 B1 | 5/2015 |
| KR | 20150066215 A | 6/2015 |
| KR | 20180092220 A | 8/2018 |
| WO | 2018105016 A1 | 6/2018 |
| WO | 2018105018 A1 | 6/2018 |

* cited by examiner

SOLDER PASTE BEAD RECOVERY SYSTEM AND METHOD

CROSS-REFERENCE TO RELATED APPLICATIONS

This application claims the benefit under 35 U.S.C. § 119(e) of U.S. Provisional Patent Application No. 62/991,744 titled SOLDER PASTE BEAD RECOVERY SYSTEM AND METHOD filed on Mar. 19, 2020, to U.S. Provisional Patent Application No. 62/861,025 titled METHOD AND SYSTEM FOR AUTOMATED CHANGEOVER AND REPLACEMENT WITHIN A STENCIL PRINTER filed on Jun. 13, 2019, to U.S. Provisional Patent Application No. 62/861,031 titled AUTOMATED PRINTER ROBOTIC ARM filed on Jun. 13, 2019, and to U.S. Patent Application Ser. No. 62/861,035 titled AUTOMATED PRINTER SMART CART filed on Jun. 13, 2019, which are incorporated herein by reference in their entirety for all purposes.

BACKGROUND OF THE DISCLOSURE

1. Field of Invention

This application relates generally to stencil printers and related methods to print viscous materials, e.g., solder paste, on an electronic substrate, e.g., a printed circuit board (PCB), and more particularly to systems and methods for recovering solder paste from a stencil that is scheduled for or in need of replacement.

2. Discussion of Related Art

In manufacturing a surface-mount printed circuit board, a stencil printer can be used to print solder paste onto the circuit board. Typically, a circuit board having a pattern of pads or some other conductive surface onto which solder paste will be deposited is automatically fed into the stencil printer; and one or more small holes or marks (known as "fiducials") on the circuit board are used to properly align the circuit board with the stencil or screen of the stencil printer prior to printing solder paste onto the circuit board. In some systems, an optical alignment system embodying a vision system is used to align the circuit board with the stencil.

Once the circuit board has been properly aligned with the stencil in the printer, the circuit board is raised to the stencil, solder paste is dispensed onto the stencil, and a wiper blade (or squeegee) traverses the stencil to force the solder paste through apertures in the stencil and onto the circuit board. As the squeegee is moved across the stencil, the solder paste tends to roll in front of the blade, which desirably causes mixing and shearing of the solder paste so as to attain a desired viscosity to facilitate filling of the apertures in the screen or stencil. The solder paste typically is dispensed onto the stencil from a standard cartridge. The stencil is then separated from the circuit board and the adhesion between the circuit board and the solder paste causes most of the material to stay on the circuit board. Material left on a bottom surface of the stencil is removed in a cleaning process before additional circuit boards are printed.

Another process in the printing of circuit boards involves inspection of the circuit boards after solder paste has been deposited on the surface of the circuit boards. Inspecting the circuit boards is important for determining that clean electrical connections can be made. An excess of solder paste can lead to shorts, while too little solder paste in appropriate positions can prevent electrical contact. Generally, the vision inspection system is further employed to provide a two-dimensional or a three-dimensional inspection of the solder paste on the circuit board.

Present day stencil printers require manual intervention to perform routine operations. For example, during a changeover, an operator must perform many manual tasks, such as changing a stencil, replacing a solder paste cartridge, replacing squeegee blades, and replacing support tooling. Each of these tasks require the operator to manually perform the task. For example, with most stencil printers, the operator must unlock the stencil, remove the stencil, properly insert a replacement stencil, and lock the replacement stencil in place. A changeover operation can take as long as 30 minutes, during which the stencil printer is not operating, which may result in the PCB fabrication line not operating.

Stencil printers further require manual intervention to perform replacement and/or replenishment operations. For example, solder paste cartridges, which supply temperature-controlled solder paste to the stencil printer, require replacement over time, e.g., within four hours or less. Items subject to normal wear and tear, such as squeegee blades and stencils, may require periodic replacement when damaged.

One issue that remains is the recovery of solder paste from a stencil that is scheduled for changeover. After a production run, or when a stencil is scheduled to be changed, solder paste left on the stencil is typically manually removed from a top surface of the stencil and saved for later use. This manual process takes time and is inefficient.

SUMMARY OF THE DISCLOSURE

One aspect of the present disclosure is directed to a stencil printer for printing an assembly material on an electronic substrate. In one embodiment, the stencil printer comprises a frame, a stencil coupled to the frame, the stencil having apertures formed therein, a support assembly coupled to the frame, the support assembly being configured to support the electronic substrate in a print position beneath the stencil, a print head gantry coupled to the frame, the print head gantry including an elongate beam that rides along rails provided on the frame, and a print head assembly supported by the print head gantry in such a manner that the print head assembly is configured to traverse the stencil during print strokes. The print head assembly includes a print head having a squeegee blade assembly configured to roll solder paste along the stencil. The stencil printer further comprises a solder paste bead recovery system configured to remove a bead of solder paste from a top surface of the stencil and to deposit the bead of solder paste onto a new replacement stencil.

Embodiments of the stencil printer further may include a paste pan of the recovery system that is configured to be positioned on the top surface of the stencil from a storage location. The storage location may be a rail of a stencil support assembly. The storage location may be positioned at a front of the stencil support assembly. The paste pan may include a flat bottom wall configured to rest on the flat surface and to enable the bead of solder paste to be rolled thereon. The elongate beam of the print head gantry may include at least one linear bearing that extends in a horizontal direction. The recovery system further may include at least one tooling member configured to move laterally on the at least one linear bearing. The at least one tooling member may include a downwardly extending pin having a head configured to be received within a receiving feature. The paste pan may include at least one receiving feature configured to be engaged by the pin of the at least one tooling member to engage and move the paste pan from the storage location to the top surface of the stencil. The at least one tooling member may include two spaced-apart tooling members, each including a pin, a first tooling member being configured to move laterally on a first linear bearing and a second tooling member being configured to move laterally on a second linear bearing. The at least one receiving feature may include two receiving features, one for each tooling member, the first and second tooling members being received in respective mating features of the paste pan to releasably secure the paste pan. The support assembly may be configured to be moved in a z-axis direction and elevated to engage magnets mounted in a bottom of the paste pan, with the support assembly including a steel surface to secure the paste pan in place on the stencil. The squeegee blade assembly may include a first squeegee blade configured to engage the stencil and roll the solder paste bead into the paste pan. The squeegee blade assembly further may include a second squeegee blade configured to engage the solder paste pan and roll the solder paste bead onto the stencil.

Another aspect of the present disclosure is directed to a method of recovering solder paste from a stencil scheduled replacement. In one embodiment, the method comprises: moving a paste pan from a storage location onto a used stencil adjacent a solder paste bead; rolling the solder paste bead onto the paste pan with a squeegee blade assembly of a print head assembly; moving the paste pan to the storage location; replacing the used stencil with a new stencil; moving the paste pan from the storage location onto the new stencil; rolling the solder paste bead onto the new stencil with the squeegee blade assembly; and moving the paste pan to the storage location.

Embodiments of the method further may include engaging a support assembly configured to be moved in a z-axis direction and elevated to magnets mounted in a bottom of the paste pan, the support assembly including a steel surface to secure the paste pan in place. Moving a paste pan from a storage location and moving the paste pan to the storage location may include positioning a downwardly extending pin of at least one tooling member of a print head assembly within a receiving feature associated with the paste pan. The at least one tooling member may include two spaced-apart tooling members, each including a pin. The at least one receiving feature may include two receiving features, the two tooling members being received in respective mating features of the paste pan to secure the paste pan. Rolling the solder paste bead onto the paste pan with a squeegee blade assembly of a print head assembly may include a first squeegee blade configured to engage the stencil and roll the solder paste bead into the paste pan. Rolling the solder paste bead onto the new stencil with the squeegee blade assembly may include a second squeegee blade configured to engage the solder paste pan and roll the solder paste bead onto the stencil. The storage location may include a rail of a stencil support assembly. The storage location may be positioned at a front of the stencil support assembly.

Another aspect of the present disclosure is directed to a stencil printer for printing an assembly material on an electronic substrate. In one embodiment, the stencil printer comprises a frame, a stencil coupled to the frame, the stencil having apertures formed therein, and a support assembly coupled to the frame, the support assembly being configured to support the electronic substrate. The stencil printer further comprises a print head gantry coupled to the frame and a print head assembly supported by the print head gantry in such a manner that the print head assembly is configured to traverse the stencil during print strokes. The stencil printer further comprises an assembly material recovery system configured to remove assembly material from a top surface of the stencil and to deposit assembly material onto a new replacement stencil. The recovery system includes a receptacle configured to be positioned on the top surface of the stencil.

Embodiments of the stencil printer further may include positioning the receptacle on the top surface of the stencil from a storage location, which is a rail of a stencil support assembly. The storage location may be positioned at a front of the stencil support assembly. The receptacle may include a flat bottom wall configured to rest on the flat surface and to enable the assembly material to be rolled thereon. The print head gantry may include an elongate beam that rides along rails provided on the frame. The elongate beam of the print head gantry may include at least one linear bearing that extends in a horizontal direction. The recovery system further may include at least one tooling member configured to move laterally on the at least one linear bearing. The at least one tooling member may include a downwardly extending pin having a head configured to be received within a receiving feature. The receptacle may include at least one receiving feature configured to be engaged by the pin of the at least one tooling member to engage and move the receptacle from the storage location to the top surface of the stencil. The at least one tooling member may include two spaced-apart tooling members, each including a pin, a first tooling member being configured to move laterally on a first linear bearing and a second tooling member being configured to move laterally on a second linear bearing. The at least one receiving feature may include two receiving features, one for each tooling member, with the first and second tooling members being received in respective mating features of the receptacle to releasably secure the receptacle. The support assembly may be configured to be moved in a z-axis direction and elevated to engage magnets mounted in a bottom of the receptacle. The support assembly may include a steel surface to secure the receptacle in place on the stencil. The print head assembly may include a print head having a squeegee blade assembly configured to move assembly material along the stencil. The squeegee blade assembly may include a first squeegee blade configured to engage the stencil and roll assembly material into the receptacle. The squeegee blade assembly further may include a second squeegee blade configured to engage the receptacle and roll assembly material onto the stencil.

Another aspect of the present disclosure is directed to a method of recovering assembly material from a stencil scheduled replacement. In one embodiment, the method comprises: moving a receptacle onto a used stencil proximate assembly material; moving assembly material onto the receptacle; removing the receptacle from the used stencil; replacing the used stencil with a new stencil; moving the receptacle onto the new stencil; moving assembly material onto the new stencil with the squeegee blade assembly; and removing the receptacle from the new stencil.

Embodiments of the method further may include when moving the receptacle onto the used stencil and removing the receptacle from the new stencil, positioning a downwardly extending pin of at least one tooling member of a print head assembly within a receiving feature associated with the receptacle. The at least one tooling member includes two spaced-apart tooling members, each including a pin. The at least one receiving feature may include two receiving features, the two tooling members being received in respective mating features of the receptacle to secure the receptacle. The method further may include engaging a support assembly configured to be moved in a z-axis direction and elevated to magnets mounted in a bottom of the receptacle, with the support assembly including a steel surface to secure the receptacle in place. Moving assembly material onto the receptacle may include moving assembly material with a squeegee blade assembly of a print head assembly. The squeegee blade assembly may include a first squeegee blade configured to engage the stencil and move assembly material into the receptacle. The squeegee blade assembly further may include a second squeegee blade configured to engage assembly material and move assembly material onto the stencil. Removing the receptacle from the used stencil and removing the receptacle from the new stencil each may include moving the receptacle to a storage location. The storage location may be a rail of a stencil support assembly.

Another aspect of the present disclosure is directed to an assembly material recovery system configured to remove assembly material from a top surface of a stencil of a stencil printer and to deposit assembly material to deposit assembly material on a new replacement stencil. In one embodiment, the recovery system comprises a receptacle configured to be positioned on the top surface of the stencil.

Embodiments of the recovery system further may include configuring the receptacle with a flat bottom wall configured to rest on the flat surface and to enable assembly material to be moved thereon. An elongate beam of the print head gantry may include at least one linear bearing that extends in a horizontal direction. The recovery system further may include at least one tooling member configured to move laterally on the at least one linear bearing. The at least one tooling member may include a downwardly extending pin having a head configured to be received within a receiving feature. The receptacle may include at least one receiving feature configured to be engaged by the pin of the at least one tooling member to engage and move the receptacle from the storage location to the top surface of the stencil. The at least one tooling member may include two spaced-apart tooling members, each including a pin, a first tooling member being configured to move laterally on a first linear bearing and a second tooling member being configured to move laterally on a second linear bearing. The at least one receiving feature may include two receiving features, one for each tooling member, with the first and second tooling members being received in respective mating features of the receptacle to releasably secure the receptacle. The support assembly may be configured to be moved in a z-axis direction and elevated to engage magnets mounted in a bottom of the receptacle, with the support assembly including a steel surface to secure the receptacle in place on the stencil.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE DISCLOSURE

Figure 1:
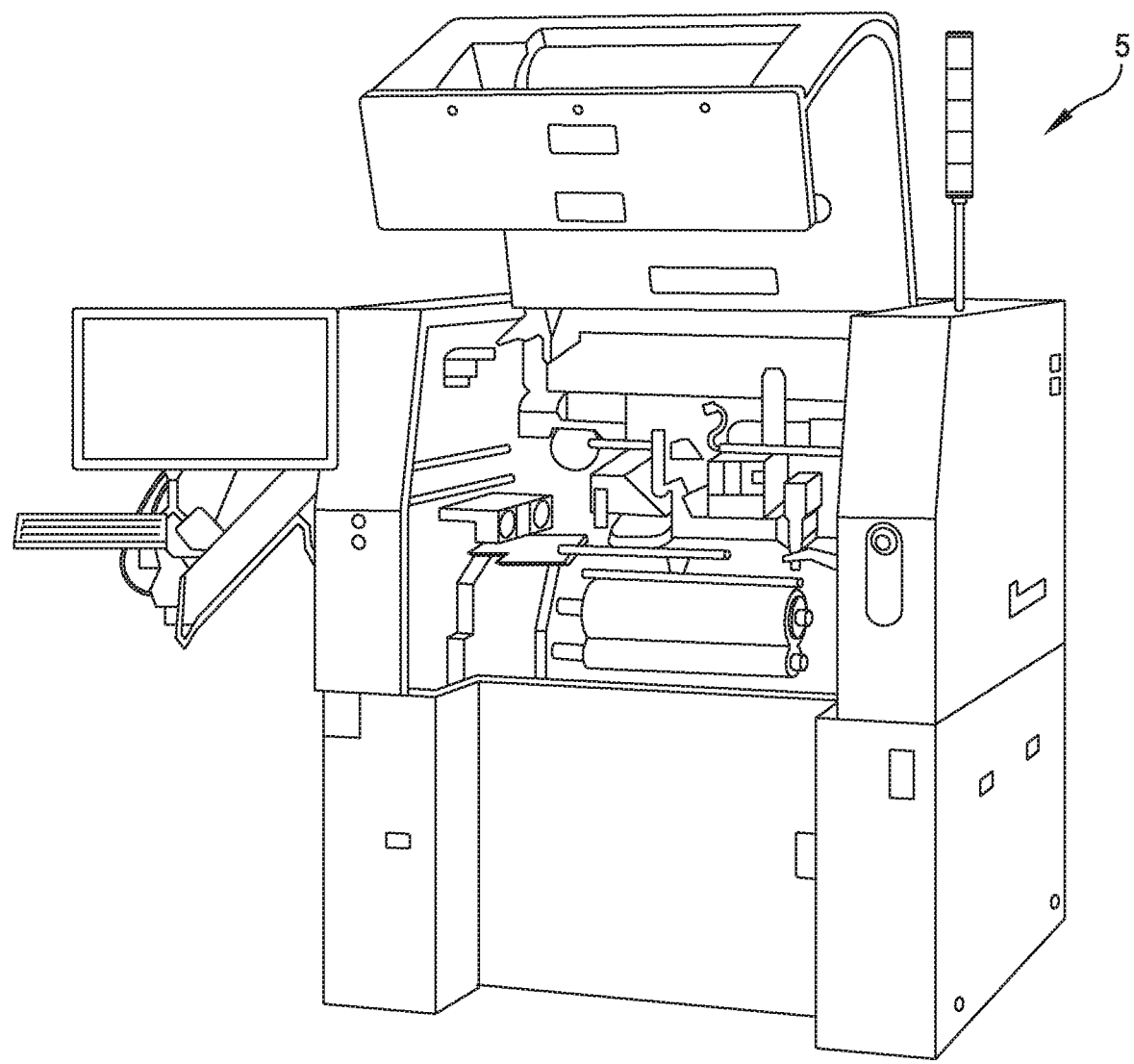
FIG. 1 is a front view of a stencil printer.

The present disclosure relates generally to material application machines (referred to herein as "stencil printers," "screen printers," "printing machines," or "printers") and other equipment utilized in a surface mount technology (SMT) process lines and configured to apply an assembly material (e.g., solder paste, conductive ink, or encapsulation material) onto a substrate (e.g., a printed circuit board, referred to herein as an "electronic substrate," a "circuit board," a "board," a "PCB," a "PCB substrate," a "substrate," or a "PCB board") or to perform other operations, such as inspection, rework, or placement of electronic components onto a substrate. Specifically, embodiments of the present disclosure are described below with reference to stencil printers used to produce printed circuit boards.

For the purposes of illustration only, and not to limit the generality, the present disclosure will now be described in detail with reference to the accompanying figures. This disclosure is not limited in its application to the details of construction and the arrangement of components set forth in the following description or illustrated in the drawings. The principles set forth in this disclosure are capable of other embodiments and of being practiced or carried out in various ways. Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

For purposes of illustration, embodiments of the present disclosure will now be described with reference to a stencil printer used to print an assembly material, such as solder paste, onto a circuit board. One skilled in the art will appreciate, however, that embodiments of the present disclosure are not limited to stencil printers that print solder paste onto circuit boards, but rather, may be used in other applications requiring dispensing of other viscous assembly materials, such as glues and encapsulents. For example, the apparatus may be used to print epoxy for use as underfill for chip-scale packages. Further, stencil printers in accordance with embodiments of the present disclosure are not limited to those that print assembly materials on circuit boards, but rather, include those used for printing other materials on a variety of substrates, such as semiconductor wafers. Also, the terms screen and stencil may be used interchangeably herein to describe a device in a printer that defines a pattern to be printed onto a substrate. In certain embodiments, the stencil printer may include a Momentum® or an Edison™ series stencil printer platform offered by ITW Electronic Assembly Equipment of Hopkinton, Mass. An exemplary stencil printer is generally designated at 5 in FIG. 1. In this embodiment, the stencil printer 5 is a Momentum® series stencil printer platform offered by ITW Electronic Assembly Equipment of Hopkinton, Mass.

Figure 2:
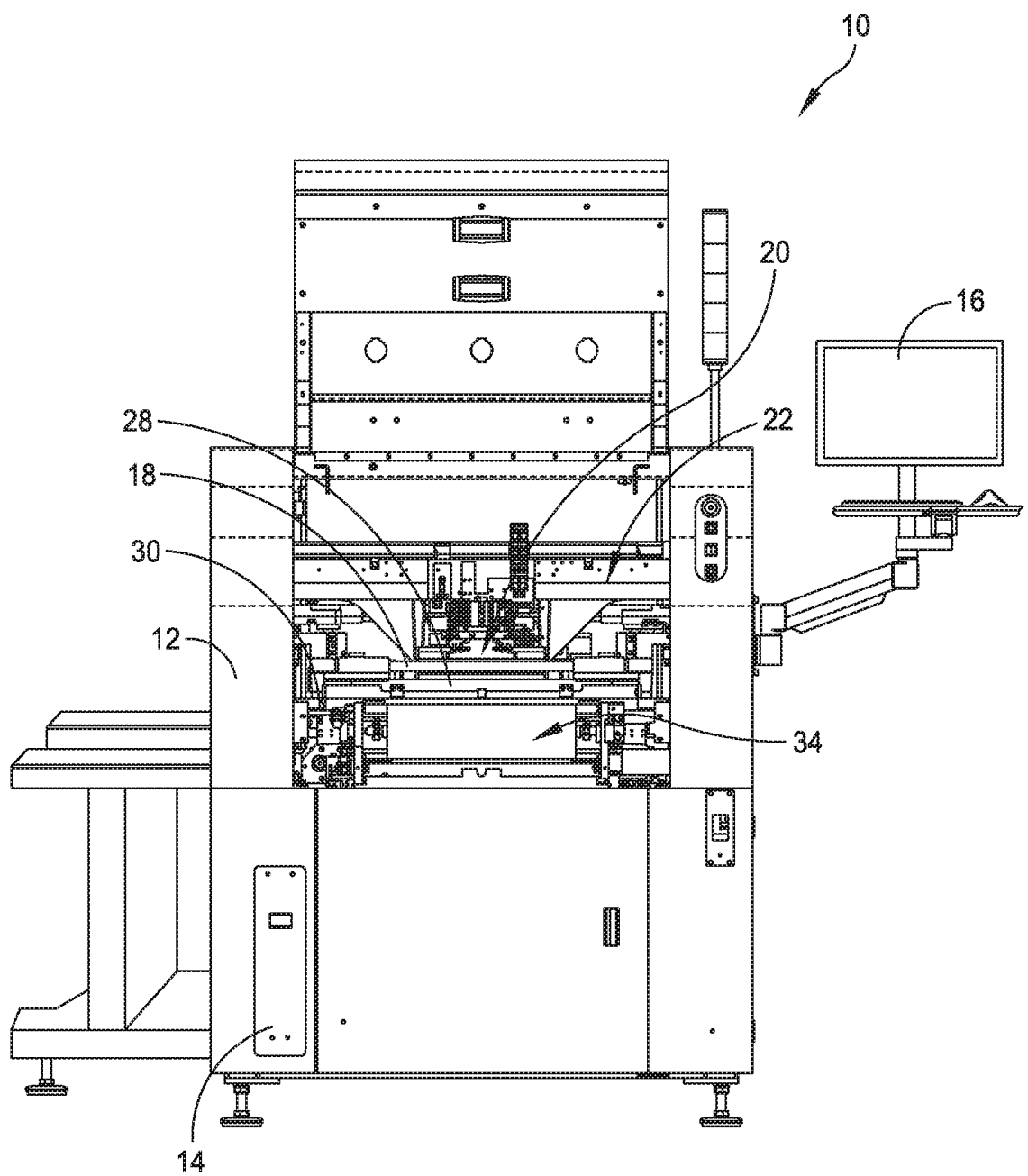
FIG. 2 is a front perspective view of a stencil printer.

Referring to FIG. 2, there is generally indicated at 10 a stencil printer of an embodiment of the disclosure. As shown, the stencil printer 10 includes a frame 12 that supports components of the stencil printer. The components of the stencil printer may include, in part, a controller 14, a display 16, a stencil 18, and a print head or print head assembly, generally indicated at 20, which is configured to apply the solder paste in a manner described in greater detail below.

As shown in FIG. 2 and described below, the stencil and the print head assembly may be suitably coupled or otherwise connected to the frame 12. In one embodiment, the print head assembly 20 may be mounted on a print head assembly gantry, generally indicated at 22, sometimes referred to as a "print head gantry," which may be mounted on the frame 12. The print head gantry 22 enables the print head assembly 20 to be moved in the y-axis direction under the control of the controller 14 and to apply pressure on the print head assembly as it engages the stencil 18. In a certain embodiment, the print head assembly 20 may be placed over the stencil 18 and may be lowered in the z-axis direction into contact and sealingly engage the stencil.

The stencil printer 10 may also include a conveyor system having rails (not shown) for transporting a printed circuit board (sometimes referred to as a "printed wiring board," "substrate," or "electronic substrate" herein) to a print position in the stencil printer. The rails sometimes may be referred to herein as a "tractor feed mechanism," which is configured to feed, load or otherwise deliver circuit boards to the working area of the stencil printer, which may be referred to herein as a "print nest," and to unload circuit boards from the print nest.

Figure 3:
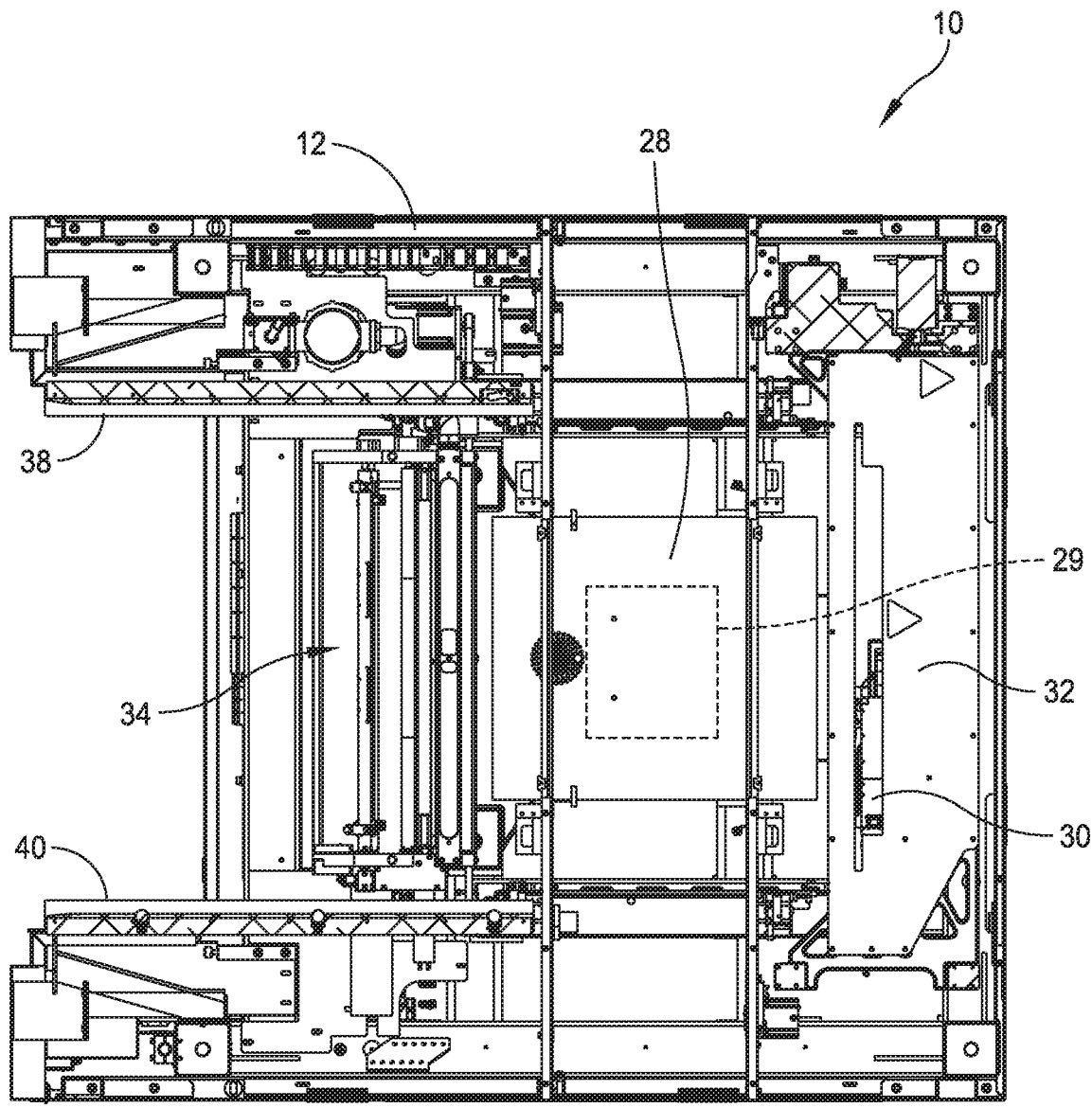
FIG. 3 is a top plan view of the stencil printer illustrated in FIG. 2 with portions removed.

Referring additionally to FIG. 3, the stencil printer 10 has a support assembly 28 to support the circuit board 29 (shown in dashed lines), which raises and secures the circuit board so that it is stable during a print operation. In certain embodiments, the substrate support assembly 28 further may include a particular substrate support system, e.g., a solid support, a plurality of pins or flexible tooling, which is positioned beneath the circuit board when the circuit board is in the print position. The substrate support system may be used, in part, to support the interior regions of the circuit board to prevent flexing or warping of the circuit board during the print operation.

In one embodiment, the print head assembly 20 may be configured to receive solder paste from a source, such as a dispenser, e.g., a solder paste cartridge, that provides solder paste to the print head assembly during the print operation. Other methods of supplying solder paste may be employed in place of the cartridge. For example, solder paste may be manually deposited between the blades or from an external source. Additionally, in a certain embodiment, the controller 14 may be configured to use a personal computer having a suitable operating system, such as a Microsoft Windows® operating system provided by Microsoft Corporation, with application specific software to control the operation of the stencil printer 10. The controller 14 may be networked with a master controller that is used to control a production line for fabricating circuit boards.

In one configuration, the stencil printer 10 operates as follows. A circuit board 29 is loaded into the stencil printer 10 using the conveyor rails. The support assembly 28 raises and secures the circuit board 29 to a print position. The print head assembly 20 is then lowered in the z-axis direction until blades of the print head assembly contact the stencil 18 at a desired pressure. The print head assembly 20 is then moved in the y-axis direction across the stencil 18 by the print head gantry 22. The print head assembly 20 deposits solder paste through apertures in the stencil 18 and onto the circuit board 29. Once the print head assembly has fully traversed the stencil 18 across the apertures, the print head assembly is lifted off the stencil and the circuit board 29 is lowered back onto the conveyor rails. The circuit board 29 is released and transported from the stencil printer 10 so that a second circuit board may be loaded into the stencil printer. To print on the second circuit board 29, the print head assembly is lowered in the z-axis direction into contact with the stencil and moved across the stencil 18 in the direction opposite to that used for the first circuit board.

An imaging system 30 may be provided for the purposes of aligning the stencil 18 with the circuit board 29 prior to printing and to inspect the circuit board after printing. In one embodiment, the imaging system 30 may be disposed between the stencil 18 and the support assembly 28 upon which a circuit board is supported. The imaging system 30 is coupled to an imaging gantry 32 to move the imaging system. In one embodiment, the imaging gantry 32 may be coupled to the frame 12, and includes a beam that extends between side rails of the frame 12 to provide back-and-forth movement of the imaging system 30 over the circuit board 29 in a y-axis direction. The imaging gantry 32 further may include a carriage device, which houses the imaging system 30, and is configured to move along the length of the beam in an x-axis direction. The construction of the imaging gantry 32 used to move the imaging system 30 is well known in the art of solder paste printing. The arrangement is such that the imaging system 30 may be located at any position below the stencil 18 and above the circuit board 29 to capture an image of predefined areas of the circuit board or the stencil, respectively.

After one or more applications of the solder paste to circuit boards, excess solder paste may accumulate at the bottom of the stencil 18 and a stencil wiper assembly, generally indicated at 34, and may move beneath the stencil to remove the excess solder paste. In other embodiments, the stencil 18 may be moved over the stencil wiper assembly.

As mentioned above, stencil printers require manual intervention to perform replacement of certain parts and/or replenishment operations. For example, a typical stencil requires replacement after a certain period of time, e.g., four hours. Also, stencils need replacement for separate production runs. In addition, solder paste cartridges, which supply temperature-controlled solder paste to the stencil printer, require replacement over time, e.g., within four hours or less. A separate production run may require a different solder paste material. Another item requiring periodic replacement is squeegee blades, which are subject to wearing during use. And finally, tooling used to support a substrate in a print position is subject to replacement when changing from one production product to another.

As mentioned above, the removed stencil typically has a bead of solder paste remaining on the stencil. Rather than disposing the solder paste, it is desired to save the solder paste for future use, given its value. Systems and methods disclosed herein are directed to automating this recovery process.

Figure 4:
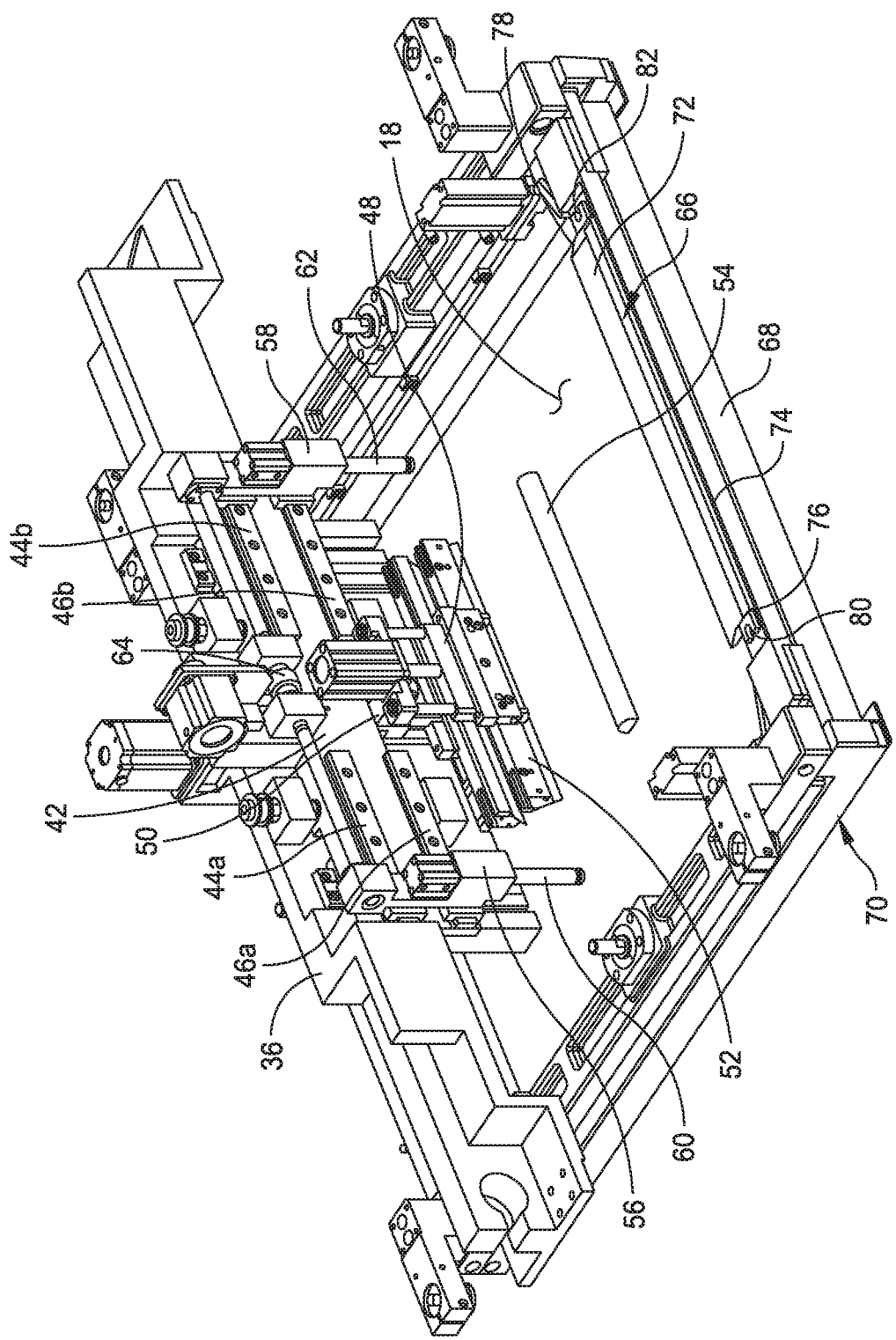
FIG. 4 is a perspective view of a print head assembly of an embodiment of the present disclosure configured to move a paste pan configured to remove and deposit solder paste on a stencil scheduled for replacement.

Referring to FIG. 4, the print head assembly 20 is mounted on the print head gantry 22 to provide movement in the y-axis direction under the control of the controller 14. The print head gantry 22 includes an elongate beam 36 that rides along rails 38, 40 (FIG. 3) provided on the frame 12 of the stencil printer 10. The beam 36 includes a plate 42 having two groups of linear bearings 44, 46 that extend in a horizontal direction on the plate, with top linear bearings 44a, 44b being disposed above bottom linear bearings 46a, 46b. The print head assembly 20 includes a print head 48, which is coupled to the beam 36 of the print head gantry 22. Specifically, the print head 48 is mounted on a carriage 50 fixedly mounted on the plate 42. Thus, the print head gantry 22 provides movement of the print head 48 in the y-axis direction to perform the print strokes described herein. The print head 48 includes a squeegee blade assembly indicated at 52 to roll solder paste along the stencil in the manner described above.

The print head assembly 20 further includes a solder paste bead recovery system, which is configured to remove a bead of solder paste 54 from a top surface of the stencil 18 and to deposit the bead of solder paste onto a new replacement stencil also indicated at 18 in the drawing figures. As shown, the recovery system includes the plate 42 that is mounted on the print head assembly 20. As mentioned above, the plate 42 includes two pairs of linear bearings 44a, 44b and 46a, 46b. As shown, linear bearings 44a, 46a are configured to support a first tooling member 56 and linear bearings 44b, 46b are configured to support a second tooling member 58, with the linear bearings 56, 58 being configured to move laterally on their respective pairs of linear bearings. The first tooling member 56 includes a downwardly extending pin 60 having a head configured to be received within a receiving feature described in greater detail below. Similarly, the second tooling member 58 includes a downwardly extending pin 62 having a head configured to be within a receiving feature.

Any suitable mechanism can be employed to move the tooling members 56, 58. For example, a ball screw drive assembly 64 can be employed to move each tooling member 56, 58 along the linear bearings 44a, 46a and 44b, 46b, respectively. In some embodiments, the ball screw drive assembly 64 provided to move the tooling members 56, 58 along the linear bearings 44a, 44b and 46a, 46b, respectively, can also power an up-and-down movement of the print head 48 in the z-axis direction. As mentioned above, the print head 48 of the print head assembly 20 is configured to be lowered to engage the stencil 18 during a print operation and raised to disengage the stencil when not performing a print operation. When lowered, the print head 48 applies pressure on the squeegee blade assembly 52 as the squeegee blade assembly sealingly engage the stencil 18.

The solder paste bead recovery system further includes a paste pan, generally indicated at 66, which is positioned at a storage location on a rail 68 of a stencil support assembly, generally indicated at 70. The paste pan 66 is sometimes referred to as a paste receptacle or a receptacle herein. As shown, the storage location of the paste pan 66 is positioned at a front of the stencil support assembly 70; however, the paste pan can be positioned toward a back of the stencil support assembly. The paste pan 66 includes a flat bottom wall 72 that rests on the flat surface of the rail 68 of the stencil support assembly 70, a back wall 74 and two triangularly-shaped side walls 76, 78. As shown, the side wall 76 includes a first receiving feature 80 that extends beyond a peripheral edge of the side wall. Similarly, the other side wall 78 includes a second receiving feature 82 that extends beyond a peripheral edge of the side wall. The receiving features 80, 82 are configured to be engaged by the pins 60, 62 of the first and second tooling members 56, 58, respectively, to engage and move the paste pan 66.

In one embodiment, the pins 60, 62 of the tooling members 56, 58 are received in respective mating features 80, 82 of the paste pan 66. The tooling members 56, 58 can be extended to a width wider than the paste pan 66, and moved toward one another to engage capture the paste pan between the pins 60, 62 via the receiving features 80, 82. Thus, the tooling members 56, 58 are configured to accommodate paste pans 66 having various widths. The print head assembly 20 is configured to be moved in the y-axis direction by the print head gantry 22 to engage and move the paste pan 66. The pins 60, 62 of the tooling members 56, 58 can employ various mechanism used to engage and move the paste pan 66. For example, the pins 60, 62 of the tooling members 56, 58 can each include magnets to facilitate attachment and detachment of the paste pan 66 from the tooling members to lift and move the paste pan.

Still referring to FIG. 4, a solder paste bead 54 remains on the rail 68 of the stencil support assembly 70 after a batch run of circuit boards is complete. A subsequent circuit board batch run may require tooling changeover, including changing the stencil 18, but use the same paste type. The solder paste bead 54 can be recovered using the solder paste bead recovery system and related methods discussed herein.

Figure 5:
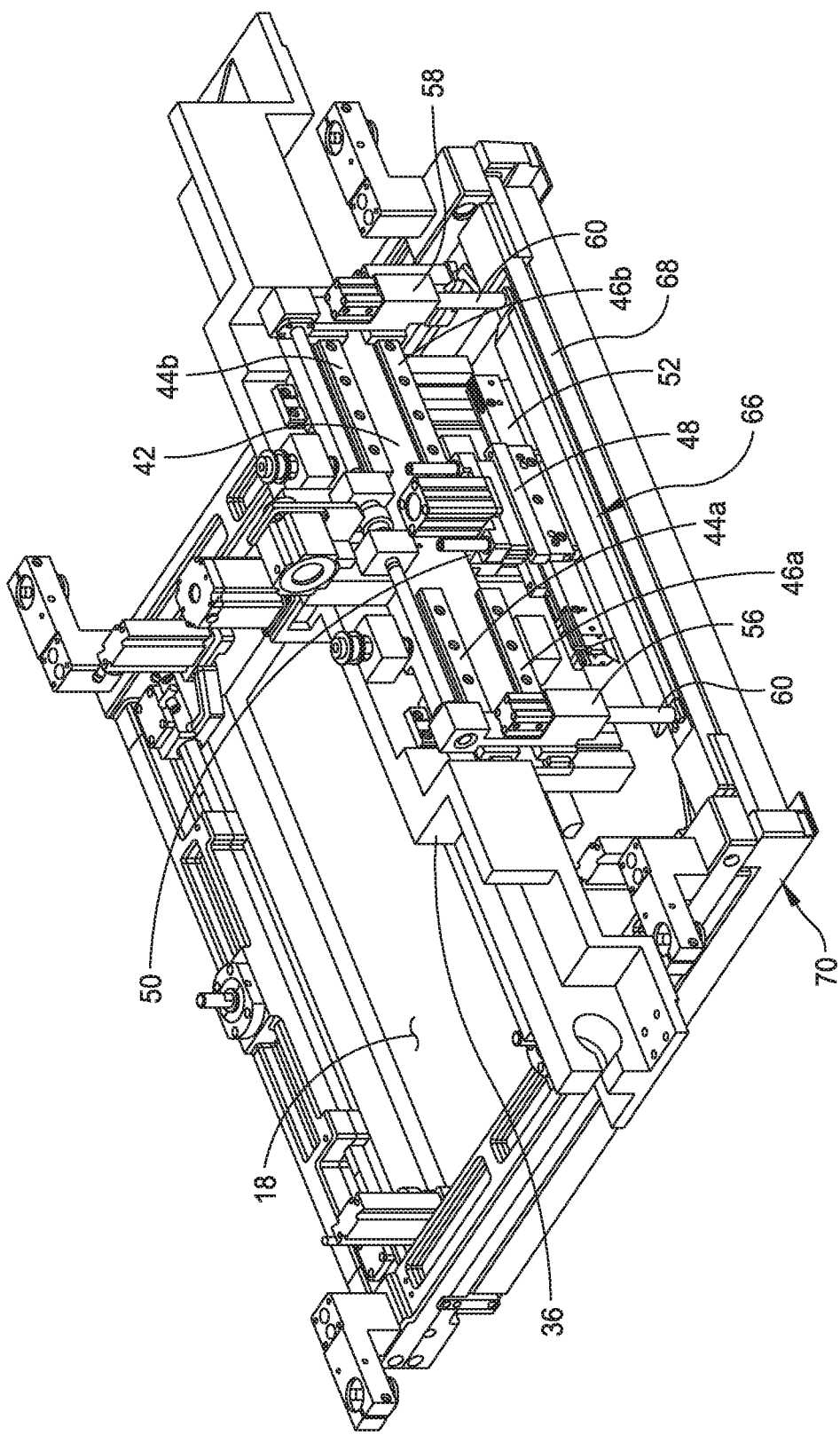
FIG. 5 is a perspective view of the print head assembly having placement pins configured to engage the paste pan located in a storage location.

Referring to FIG. 5, the print head gantry 22 is configured to move the print head assembly 20 to retrieve the paste pan 66 from its storage location using the pins 60, 62 of the tooling members 56, 58, which, in one embodiment, can be configured to articulate in the x-axis, y-axis and z-axis directions of the stencil printer 10 to lift the paste pan 66 off the rail 68 of the stencil support assembly 70 and to move the paste pan in a desired direction, e.g., the y-axis direction. As shown, with the print head 48 raised, the print head assembly 20 is moved to a position above the paste pan 66, with the pins 60, 62 of the tooling members 58, 60 being located above their respective receiving features 80, 82.

Figure 6:
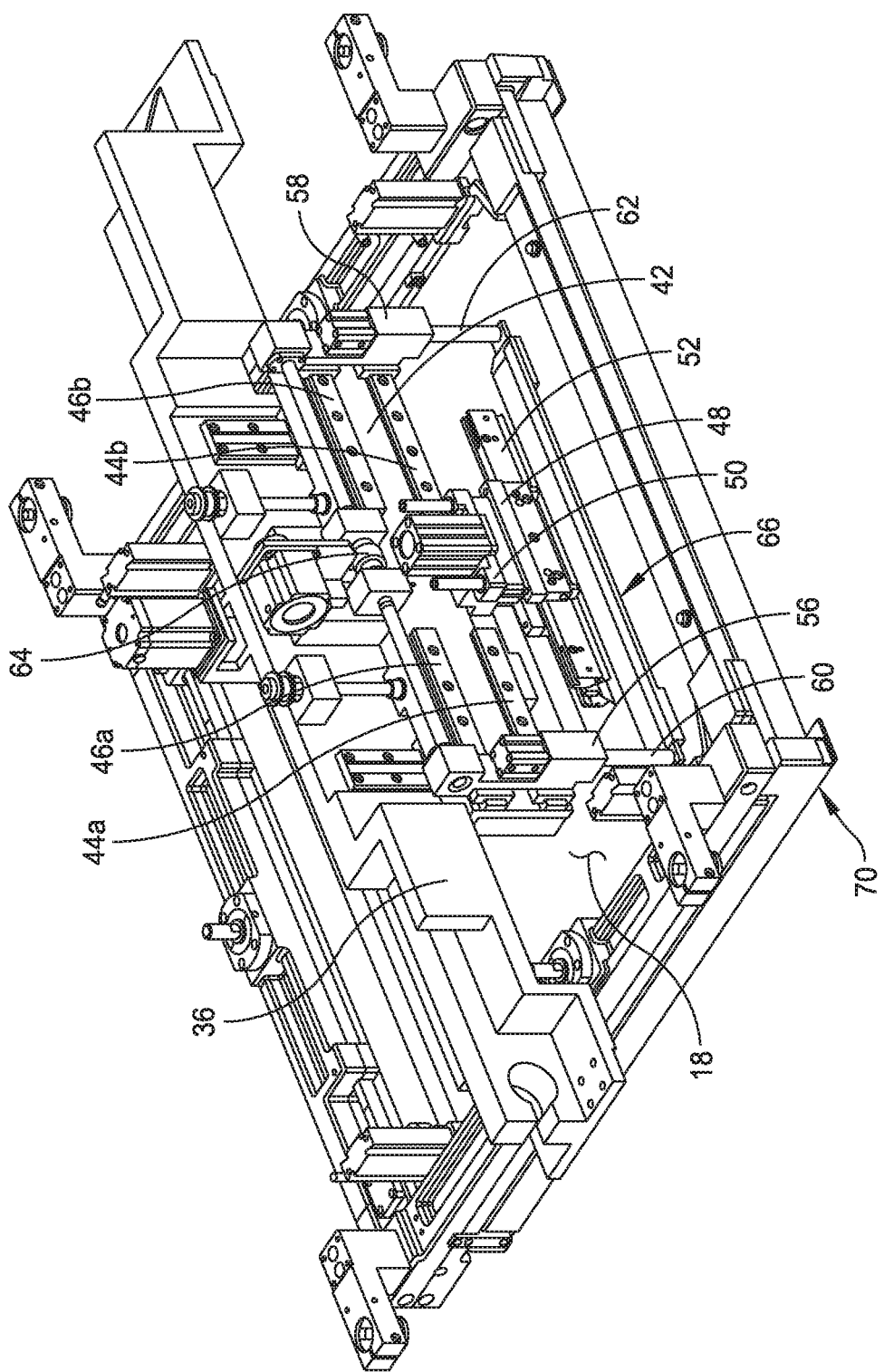
FIG. 6 is a perspective view of the print head assembly moving the paste pan.

Referring to FIG. 6, the print head gantry 22 is configured to remove the paste pan 66 from the storage location on the rail 68 of the stencil support assembly 70 and to place the paste pan on the stencil 18 in a designated paste transfer position. The movement of the paste pan 66 to the shown location can be in response to a stencil change operation dictated by the controller 14. The replacement of the stencil 18 can be prescheduled or in response to an issue with the stencil, e.g., clogged apertures that cannot be sufficiently cleaned by the stencil wiper assembly 34. As shown, a leading edge of the bottom wall 72 of the paste pan 66 is positioned adjacent to the solder paste bead 54.

Figure 7:
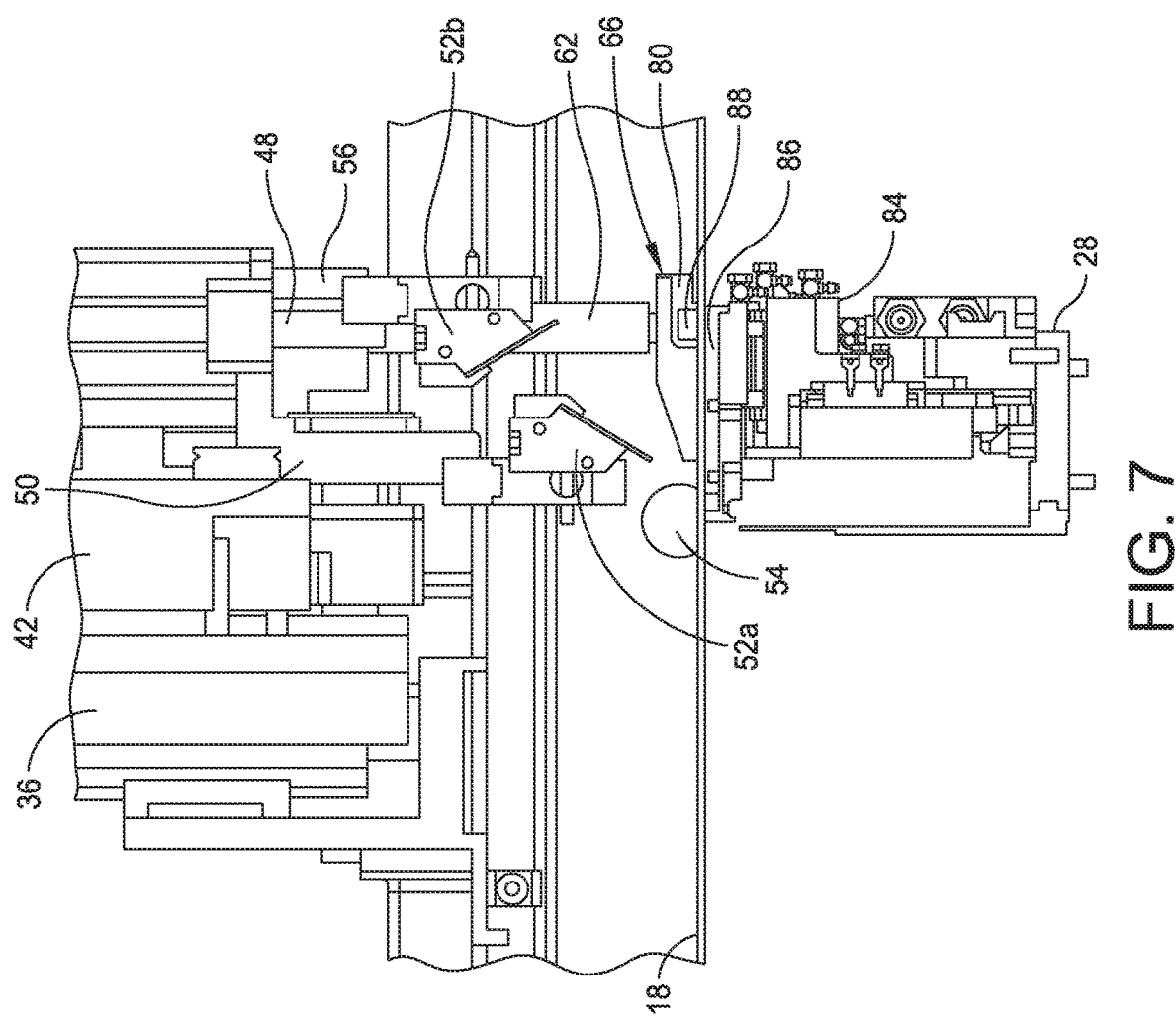
FIG. 7 is an elevational view of a portion of the print head assembly prior to removing a solder paste bead with the paste pan.
Figure 8:
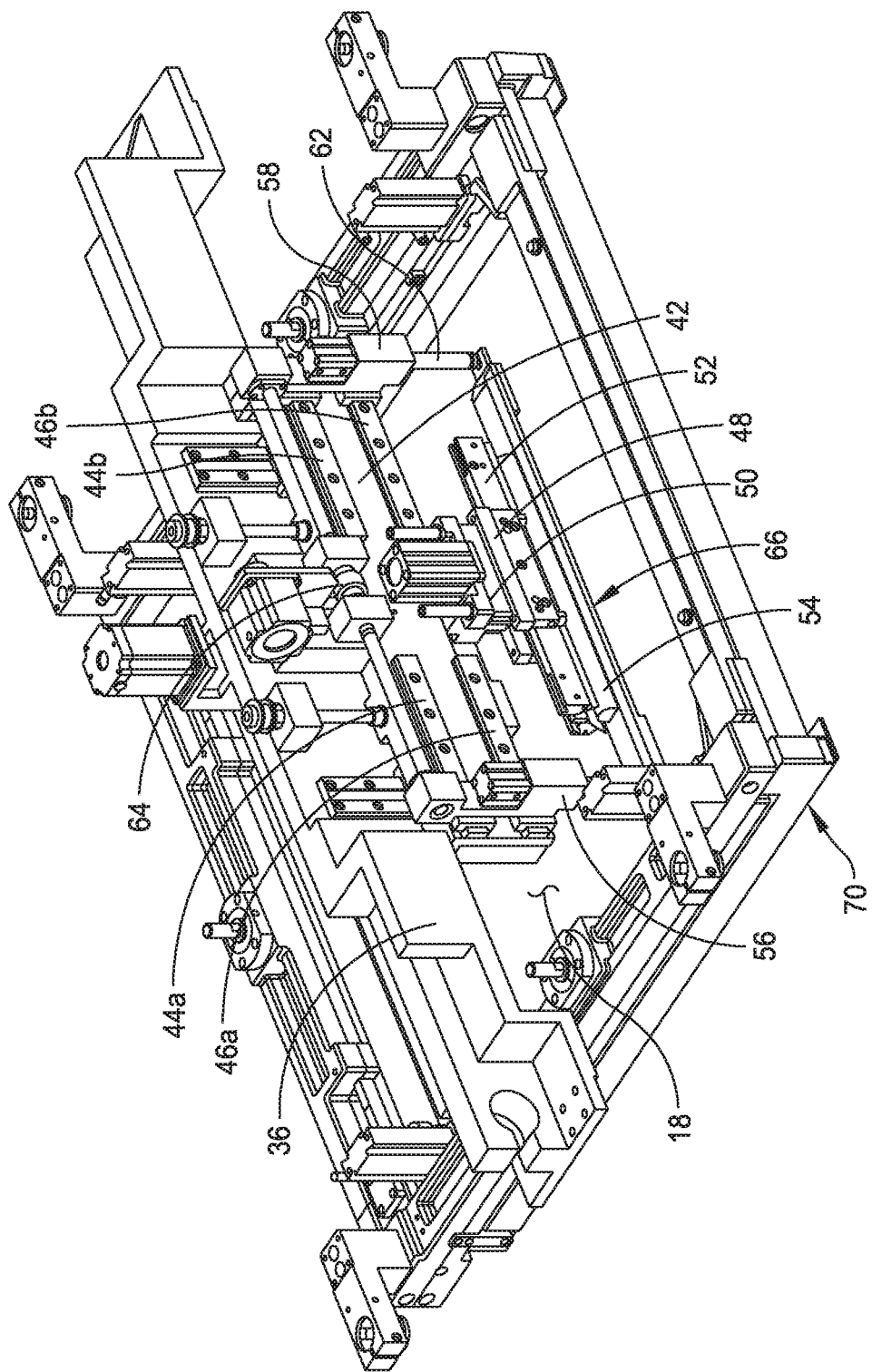
FIG. 8 is a perspective view of the print head assembly having a print head configured to move the solder paste bead into the paste pan.

Referring to FIGS. 7 and 8, once positioned, the support assembly 28, sometimes referred to as a "work table," is configured to be moved in a z-axis direction and elevated toward the stencil 18. The support assembly 28 includes a flipper mechanism 84 having a metal surface, e.g., steel surface 86, which, when raised, is configured to engage a bottom surface of the stencil 18. The paste pan 66 is configured to include one or more magnets, indicated at 88, provided in the bottom wall 72 of the paste pan. The arrangement is such that the magnets 88 of the paste pan 66 engage the steel surface 86 of the flipper mechanism 84 to hold the paste pan in the transfer position as the solder paste bead is squeegeed onto the paste pan. As shown, one of the squeegee blades, e.g., squeegee blade 52a, is configured to engage the stencil 18 and roll the solder paste bead 54 into the paste pan. The print head 48 of the print head assembly 20 is configured to move the squeegee blade 52a in a z-axis direction so that the squeegee blade engages the stencil and to move in the x-axis direction by moving the print head gantry 22 toward the paste pan 66 to roll the solder paste bead 54 into the paste pan.

Figure 9:
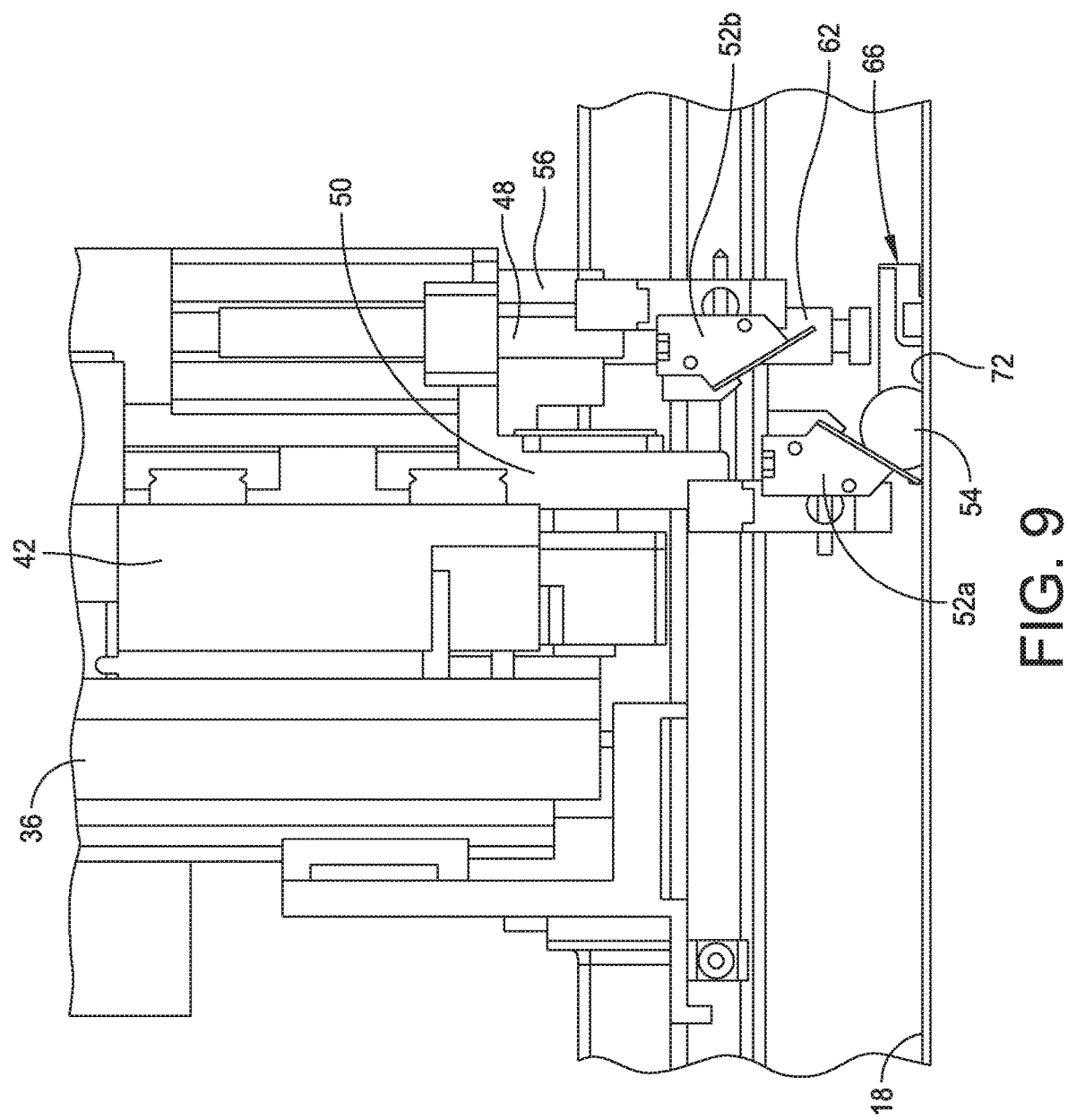
FIG. 9 is an elevational view of a portion of the print head assembly showing the print head moving the solder paste bead into the paste pan.

Referring to FIG. 9, the squeegee blade 52a is shown rolling the solder paste bead 54 into the paste pan 66. As shown, the solder paste bead 54 is supported on the bottom wall of the paste pan 66. Once the transfer is complete, the flipper mechanism 84 (not shown) is lowered to disengage the magnets 88 (not shown) and thus enable the paste pan 66 to be moved with respect to the stencil 18.

Figure 10:
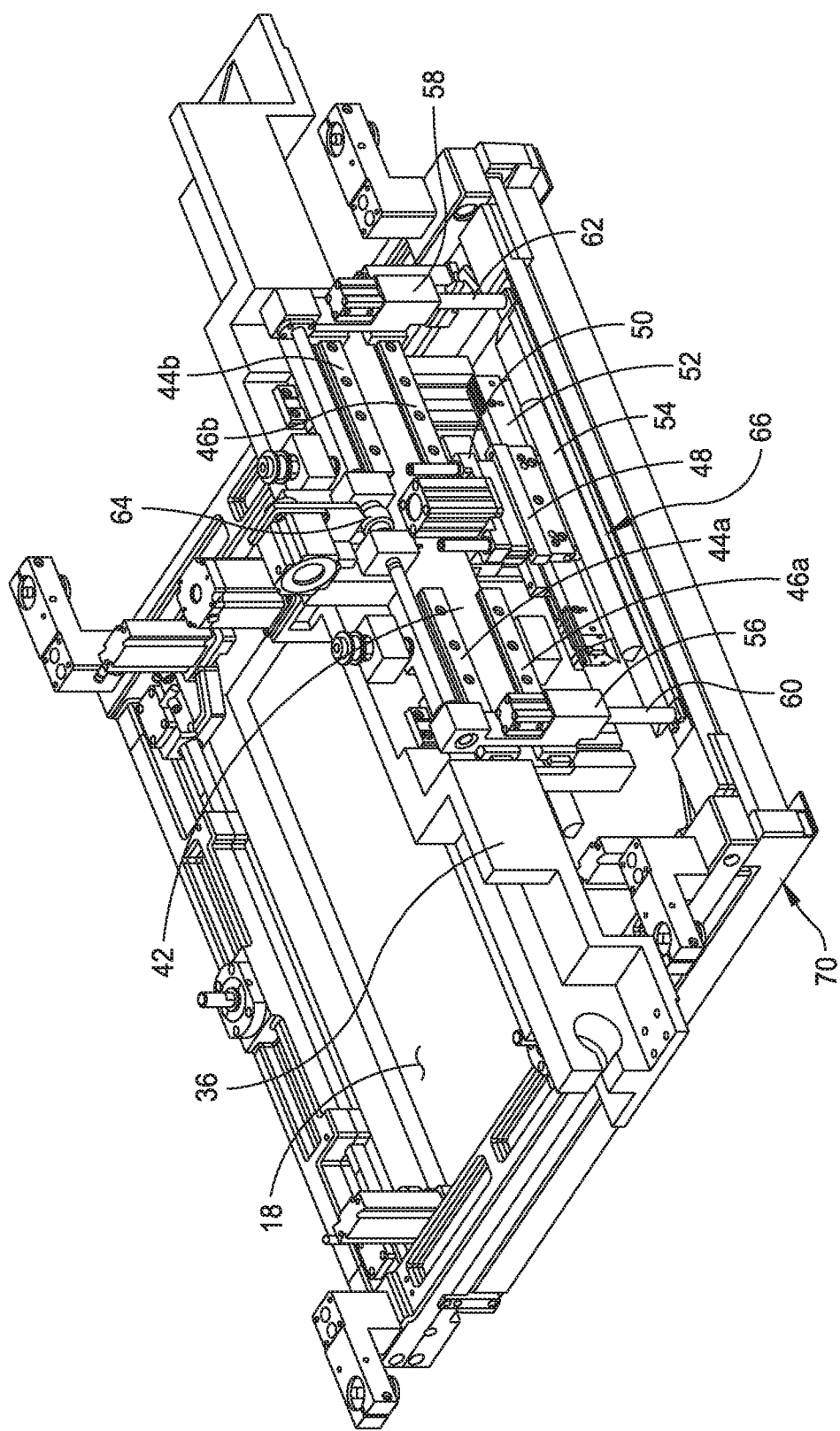
FIG. 10 is a perspective view of the print head assembly moving the paste pan to the storage location.

Referring to FIG. 10, the paste pan 66 with solder paste bead 54 is returned to the storage location on the rail 68 of the stencil support assembly 70. Once the paste pan 66 is positioned to the storage location, the tooling changeover continues, including the removal of the used stencil 18 and the replacement with a clean stencil 18. This process can be employed when there is a defect detected with the stencil 18 thereby requiring changing of the stencil.

Figure 11:
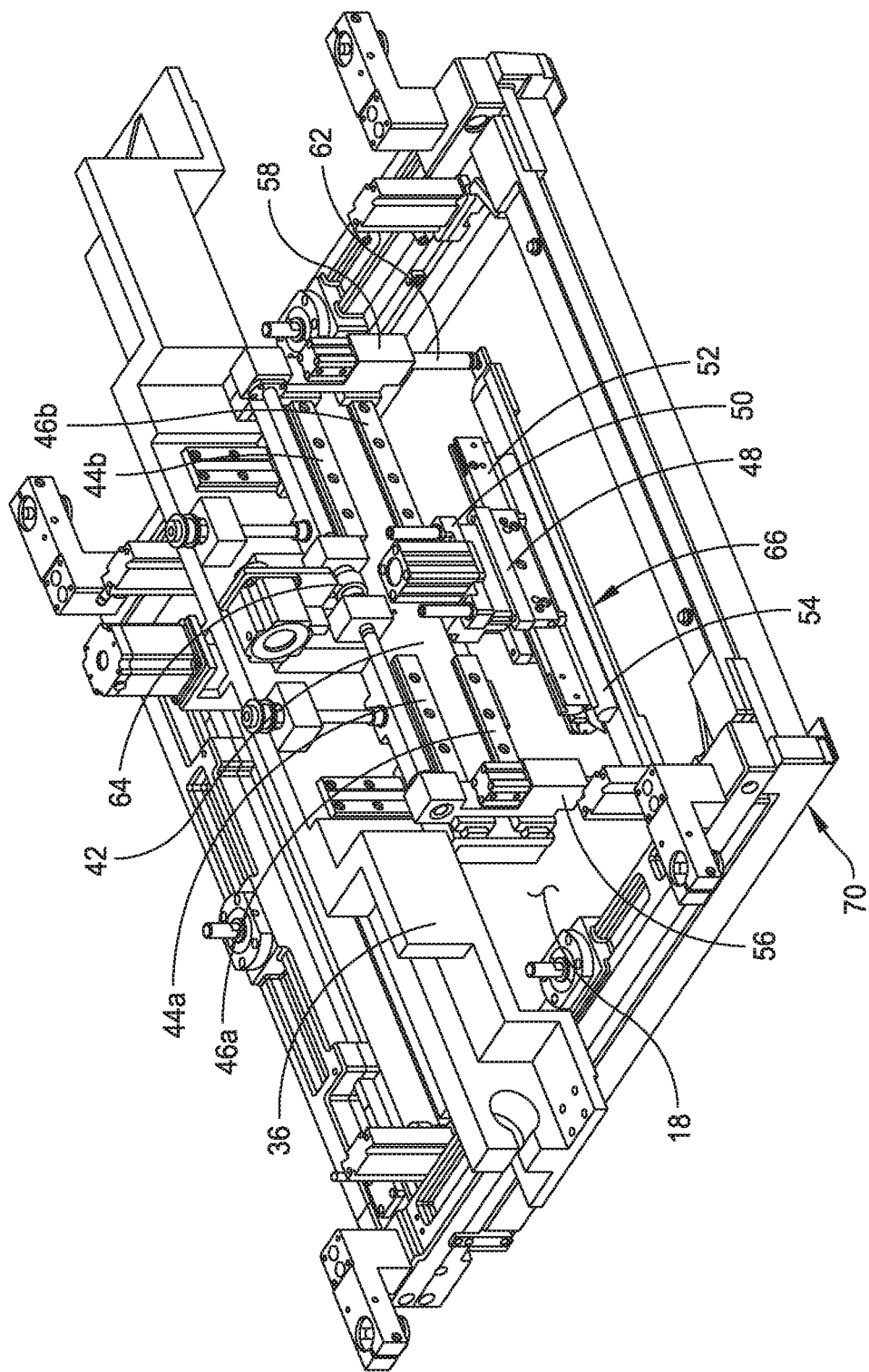
FIG. 11 is a perspective view of the print head assembly moving the paste pan from the storage location to a deposit location.

Referring to FIG. 11, once the stencil 18 is changed, the paste pan 66 is then retrieved from the storage location on the rail 68 of the stencil support assembly 70 by the first and second tooling members 56, 58 of the print head assembly 20. Once secured, the paste pan 66 is moved in the x-axis direction by moving the print head gantry 22 and lowered into the paste transfer position on the clean stencil 18.

Figure 12:
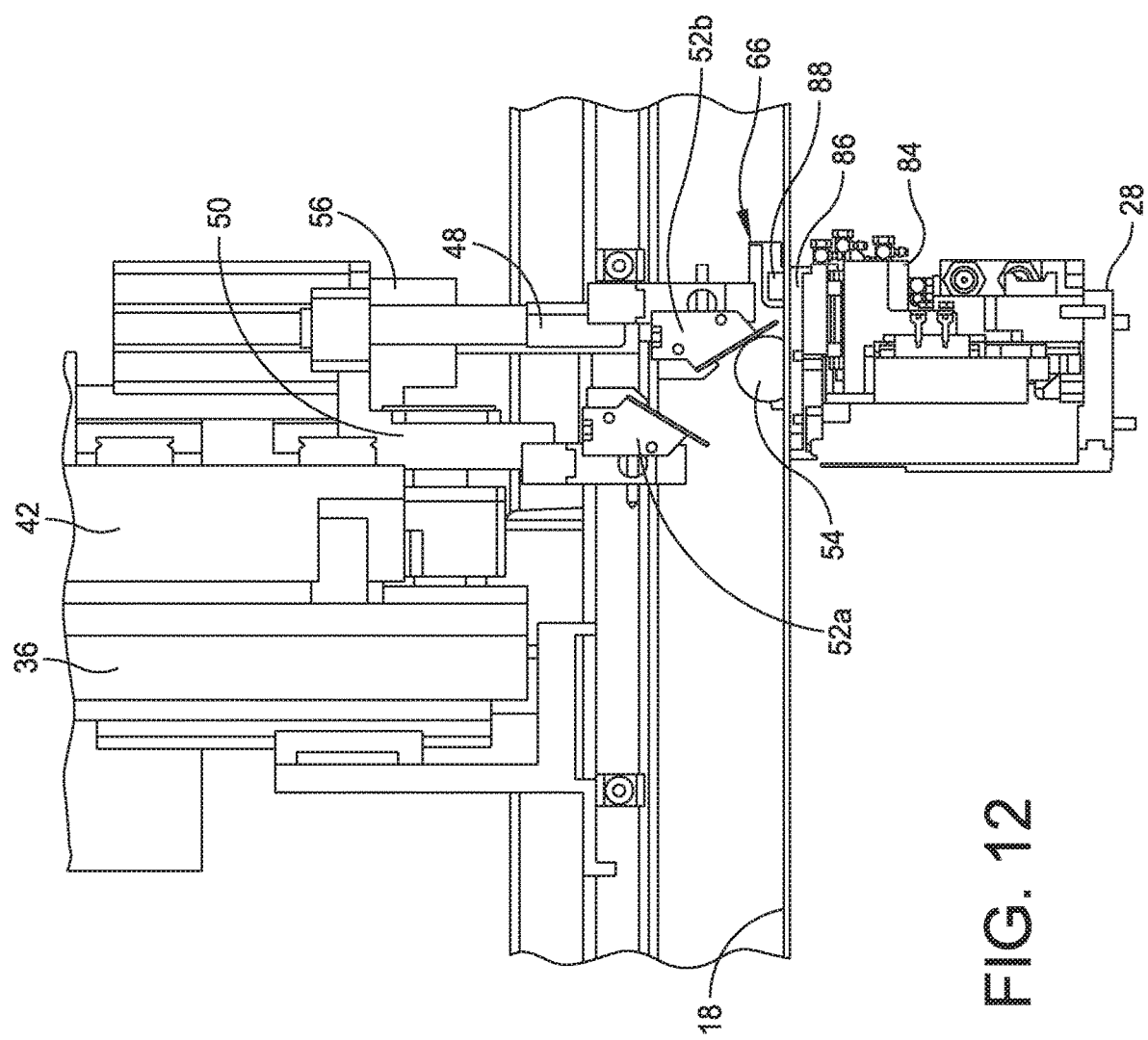
FIG. 12 is an elevational view of a portion of the print head assembly with the print head being configured to deposit the solder paste bead on a replacement stencil.
Figure 13:
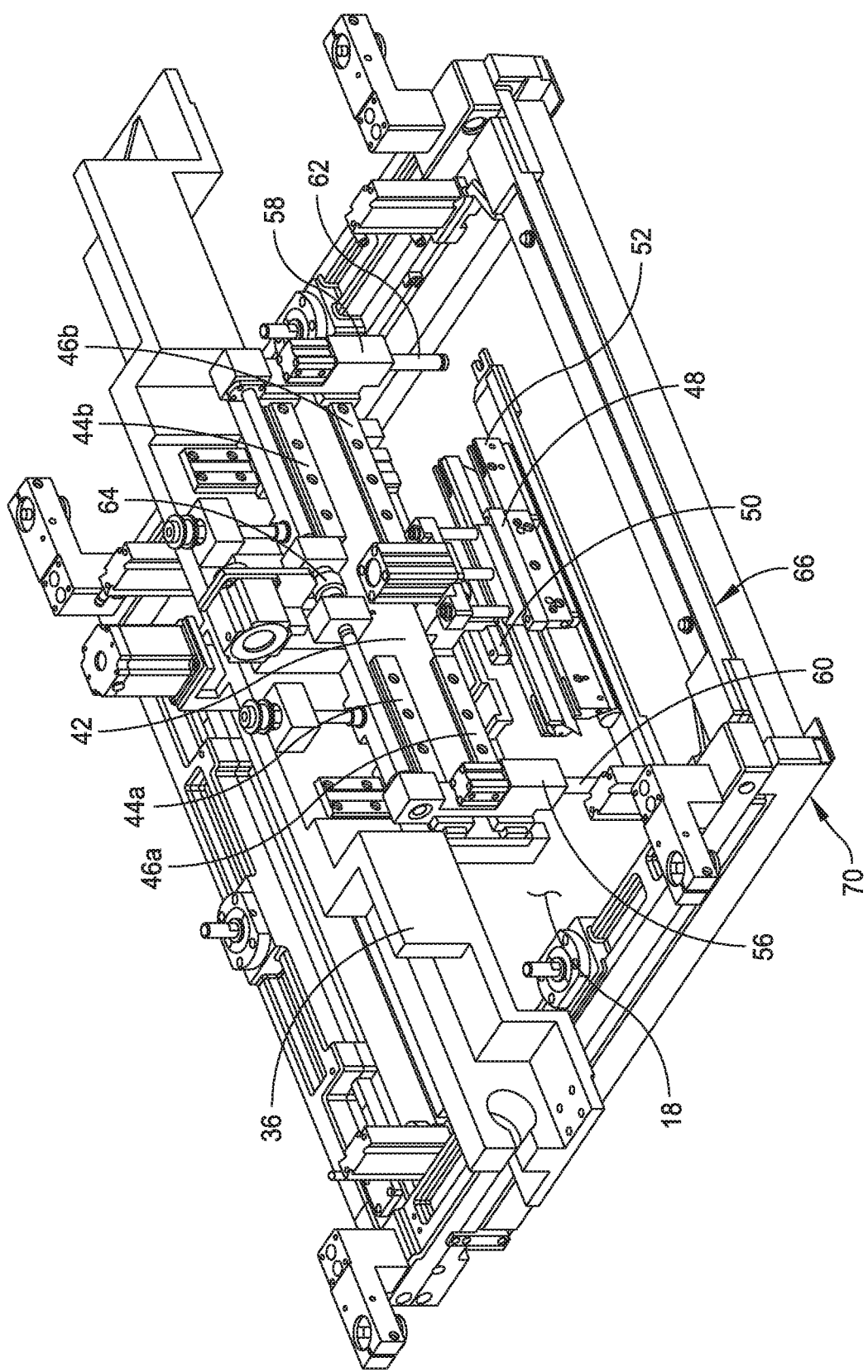
FIG. 13 is a perspective view of the print head assembly with the print head moving the solder paste bead onto the replacement stencil.

Referring to FIGS. 12 and 13, the support assembly 28 is moved upwardly in the z-axis direction and elevated to engage the magnets 88 mounted in the bottom wall 72 of the paste pan 66 to the steel surface 86 of the flipper mechanism 84 associated with the support assembly 28. As described above, the engagement of the steel surface 86 of the flipper mechanism 84 and the magnets 88 holds the paste pan 66 in the transfer position as the solder paste bead 54 is squeegeed back onto the new, clean stencil 18. As shown, the other of the squeegee blades, e.g., squeegee blade 52b, is configured to engage the bottom wall 72 of the paste pan 66 and to roll the solder paste bead 54 into the stencil 18.

Figure 14:
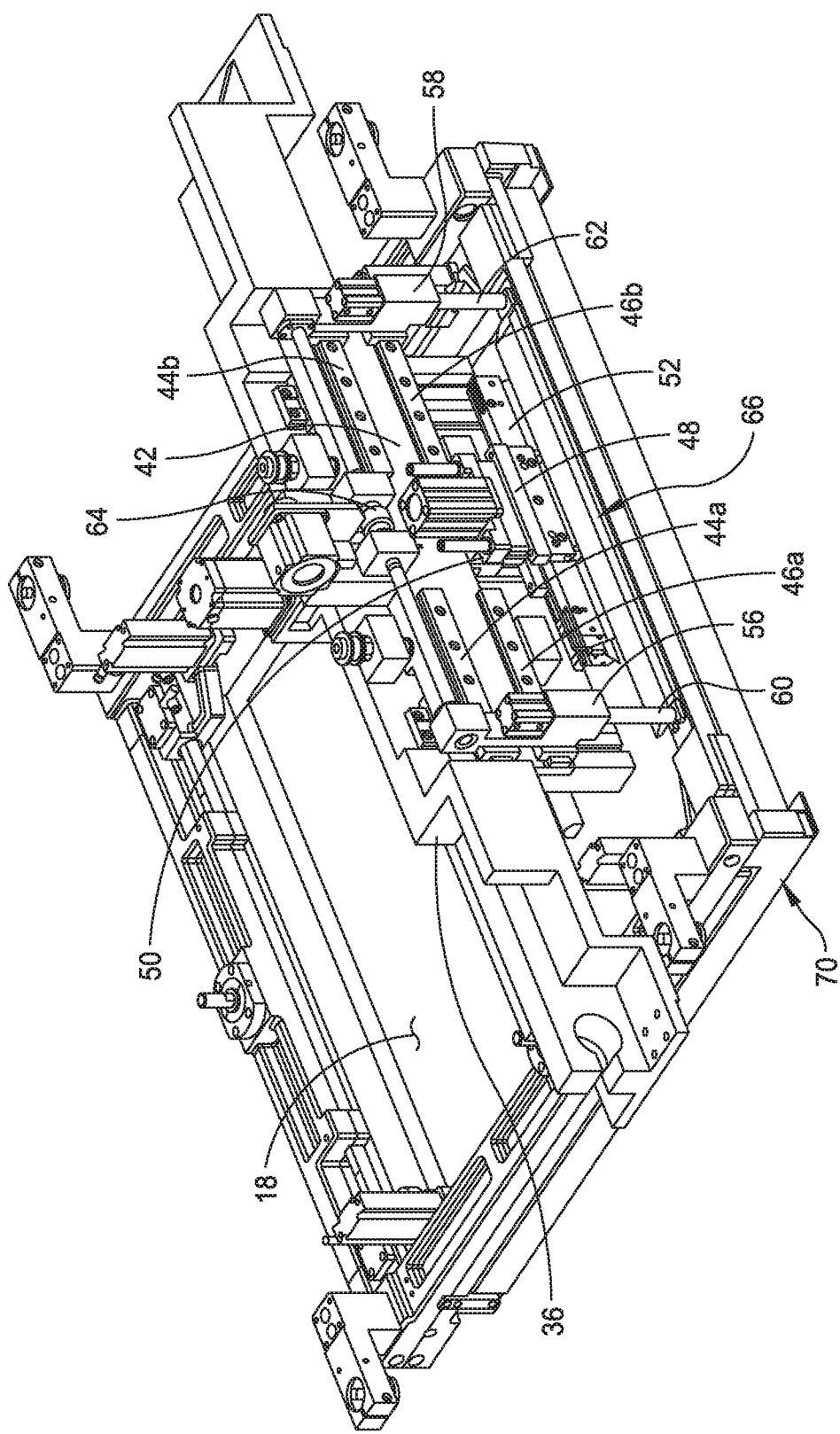
FIG. 14 is a perspective view of the print head assembly moving the paste pan to the storage location.

Referring to FIG. 14, the print head assembly 20 returns the paste pan 66 to the storage location as described above.

Figure 15:
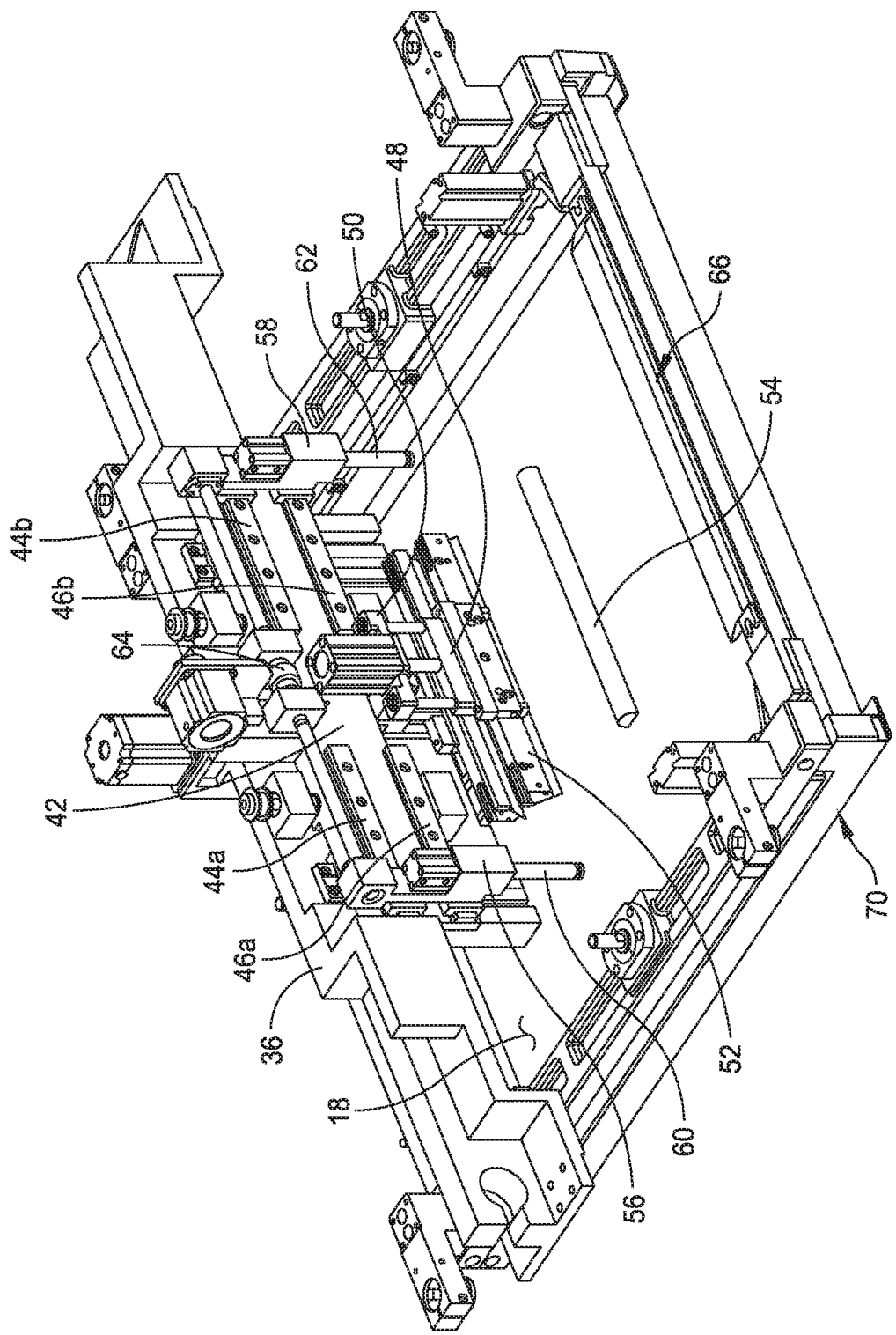
FIG. 15 is a perspective view of the print head assembly showing the print head in a stencil print position.

Referring to FIG. 15, the stencil printer 10 is ready for printing using the solder paste bead 54 transferred from the previous batch run.

Figure 16:
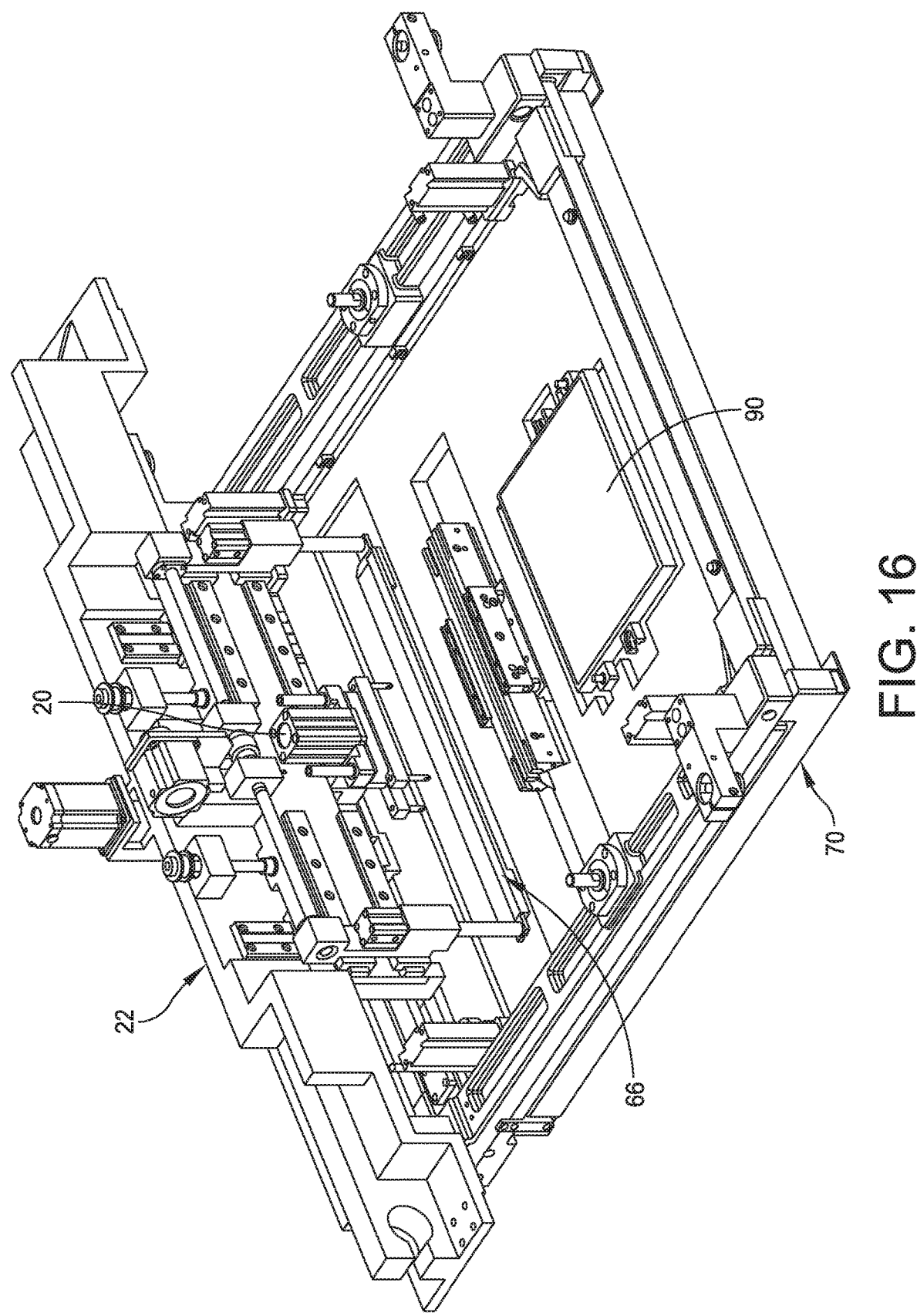
FIG. 16 is a perspective view of a print head assembly of another embodiment of the present disclosure configured to move a paste pan configured to remove and deposit solder paste on a stencil scheduled for replacement.

Referring to FIG. 16, if a different solder paste type is going to be used for the next circuit board batch, the paste pan 66 can be changed along with the other tooling during the automated tooling changeover, e.g., tooling plate 90. A clean paste pan 66 can be loaded along with the other tooling using a tooling tray, and then placed in a storage location. This process will prevent any cross contamination of paste types between batch runs.

Embodiments of the present disclosure include a method of recovering solder paste from a stencil scheduled replacement. In one embodiment, the method includes moving the paste pan 66 from the storage location onto a used stencil 18 adjacent the solder paste bead 54. The method further includes rolling the solder paste bead 54 onto the paste pan 66 with the squeegee blade assembly 52 of the print head assembly 20. Next, the paste pan 66 is moved back to the storage location and the used stencil 18 is replaced a new stencil 18. The method further includes moving the paste pan 66 from the storage location onto the new stencil 18 and rolling the solder paste bead 54 onto the new stencil 18 with the squeegee blade assembly 52. The method further includes moving the paste pan 66 back to the storage location until the process is initiated again.

The solder paste bead recovery system and related methods may be performed under the control of controller 14. Specifically, the controller 14 can be configured to know when to perform a solder recovery process.

In some embodiments, existing stencil printer gantries, rails and print head of the stencil printer 10 can be configured to shuttle items in and out, including the paste pan 66.

In some embodiments, the print head assembly 20 of the stencil printer 10 can be configured to move and shuttle a paste pan 66.

As used herein, an "automated" or "fully automated" changeover describes the replacement or replenishment of an item without human intervention.

As used herein, a "partially automated" changeover describes the replacement or replenishment of an item with some or limited human intervention.

As used herein, "transport" or "transporting" describes moving an item from one position to another, either manually or with a machine.

As used herein, "install" or "installing" describes the process of placing an item in a position ready for use.

As mentioned above, the movable cart can be employed to replace other items within the stencil printer. For example, the stencil wiper assembly includes consumables, e.g., paper and solvent, which can be automatically replaced by the movable cart.

The concepts disclosed herein may be employed in other types of equipment used to fabricate electronic substrates, including dispensers, pick-and-place machines, reflow ovens, wave soldering machines, selective solder machines, inspection stations, and cleaning stations. For example, the concepts directed to recapturing materials can be employed in soldering and wave soldering machines and in cleaning stations.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the disclosure.

Accordingly, the foregoing description and drawings are by way of example only.

What is claimed is:

1. A stencil printer for printing an assembly material on an electronic substrate, the stencil printer comprising:
    a frame;
    a stencil coupled to the frame, the stencil having apertures formed therein;
    a support assembly coupled to the frame, the support assembly being configured to support the electronic substrate;
    a print head gantry coupled to the frame, the print head gantry including an elongate beam that rides along rails provided on the frame, the elongate beam of the print head gantry having at least one linear bearing that extends in a horizontal direction;
    a print head assembly supported by the print head gantry in such a manner that the print head assembly is configured to traverse the stencil during print strokes; and
    an assembly material recovery system configured to remove assembly material from a top surface of the stencil and to deposit assembly material onto a new replacement stencil, the recovery system including a receptacle configured to be positioned on the top surface of the stencil and at least one tooling member configured to move laterally on the at least one linear bearing.

2. The stencil printer of claim 1, wherein the receptacle is positioned on the top surface of the stencil from a storage location, which is a rail of a stencil support assembly.

3. The stencil printer of claim 1, wherein the receptacle includes a flat bottom wall configured to rest on the flat surface and to enable the assembly material to be rolled thereon.

4. The stencil printer of claim 1, wherein the at least one tooling member includes a downwardly extending pin having a head configured to be received within a receiving feature.

5. The stencil printer of claim 4, wherein the receptacle includes at least one receiving feature configured to be engaged by the pin of the at least one tooling member to engage and move the receptacle from the storage location to the top surface of the stencil.

6. The stencil printer of claim 5, wherein the at least one tooling member includes two spaced-apart tooling members, each including a pin, a first tooling member being configured to move laterally on a first linear bearing and a second tooling member being configured to move laterally on a second linear bearing, and wherein the at least one receiving feature includes two receiving features, one for each tooling member, the first and second tooling members being received in respective mating features of the receptacle to releasably secure the receptacle.

7. The stencil printer of claim 6, wherein the support assembly is configured to be moved in a z-axis direction and elevated to engage magnets mounted in a bottom of the receptacle, the support assembly including a steel surface to secure the receptacle in place on the stencil.

8. The stencil printer of claim 7, wherein the print head assembly includes a print head having a squeegee blade assembly configured to move assembly material along the stencil, the squeegee blade assembly including a first squeegee blade configured to engage the stencil and roll assembly material into the receptacle.

9. The stencil printer of claim 8, wherein the squeegee blade assembly further includes a second squeegee blade configured to engage the receptacle and roll assembly material onto the stencil.

10. A method of recovering assembly material from a stencil scheduled replacement within the stencil printer of claim 1, the method comprising:
    moving a receptacle onto a used stencil proximate assembly material;
    moving assembly material onto the receptacle;
    removing the receptacle from the used stencil;
    replacing the used stencil with a new stencil;
    moving the receptacle onto the new stencil;
    moving assembly material onto the new stencil with the squeegee blade assembly; and
    removing the receptacle from the new stencil.

11. The method of claim 10, wherein moving the receptacle onto the used stencil and removing the receptacle from the new stencil includes positioning a downwardly extending pin of at least one tooling member of a print head assembly within a receiving feature associated with the receptacle.

12. The method of claim 11, wherein the at least one tooling member includes two spaced-apart tooling members, each including a pin, and wherein the at least one receiving feature includes two receiving features, the two tooling members being received in respective mating features of the receptacle to secure the receptacle.

13. The method of claim 12, further comprising engaging a support assembly configured to be moved in a z-axis direction and elevated to magnets mounted in a bottom of the receptacle, the support assembly including a steel surface to secure the receptacle in place.

14. The method of claim 11, wherein moving assembly material onto the receptacle includes moving assembly material with a squeegee blade assembly of a print head assembly.

15. The method of claim 14, wherein the squeegee blade assembly includes a first squeegee blade configured to engage the stencil and move assembly material into the receptacle.

16. The method of claim 15, wherein the squeegee blade assembly further includes a second squeegee blade configured to engage assembly material and move assembly material onto the stencil.

17. The method of claim 11, removing the receptacle from the used stencil and removing the receptacle from the new stencil each includes moving the receptacle to a storage location on a rail of a stencil support assembly.

18. An assembly material recovery system configured to remove assembly material from a top surface of a stencil of a stencil printer and to deposit assembly material to deposit assembly material on a new replacement stencil, the stencil printer including a print head gantry having an elongate beam with at least one linear bearing that extends in a horizontal direction, the recovery system comprising:
    a receptacle configured to be positioned on the top surface of the stencil; and
    at least one tooling member configured to move laterally on the at least one linear bearing.

19. The recovery system of claim 18, wherein the receptacle includes a flat bottom wall configured to rest on the flat surface and to enable assembly material to be moved thereon.

20. The recovery system of claim 18, wherein the at least one tooling member includes a downwardly extending pin having a head configured to be received within a receiving feature.

21. The recovery system of claim 20, wherein the receptacle includes at least one receiving feature configured to be engaged by the pin of the at least one tooling member to engage and move the receptacle from the storage location to the top surface of the stencil.

22. The recovery system of claim 21, wherein the at least one tooling member includes two spaced-apart tooling members, each including a pin, a first tooling member being configured to move laterally on a first linear bearing and a second tooling member being configured to move laterally on a second linear bearing, and wherein the at least one receiving feature includes two receiving features, one for each tooling member, the first and second tooling members being received in respective mating features of the receptacle to releasably secure the receptacle.

23. The recovery system of claim 22 wherein the support assembly is configured to be moved in a z-axis direction and elevated to engage magnets mounted in a bottom of the receptacle, the support assembly including a steel surface to secure the receptacle in place on the stencil.

* * * * *